United States Patent Office 3,201,431
Patented Aug. 17, 1965

3,201,431
SELECTIVE HYDROGENATION OF MALVALIC AND STERCULIC ACIDS IN COTTONSEED OIL
Dwight R. Merker, Chicago, and Karl F. Mattil, Downers Grove, Ill., assignors to Swift & Company, Chicago, Ill., a corporation of Illinois
No Drawing. Filed Mar. 19, 1963, Ser. No. 266,214
10 Claims. (Cl. 260—409)

This invention relates to a method for the selective hydrogenation of cyclopropenyl double bonds in fatty acid esters present in some vegetable oils, and more particularly to the removal of Halphen acids from fatty oils.

Malvalic and sterculic acids which contain cyclopropenyl double bonds have been found to be associated with the triglycerides of certain vegetable oils. The concentration of these acids in cottonseed oils is said to be up to about 3%. The well-known Halphen test for cottonseed oil is caused by the presence of these acids, and thus the acids are then referred to as "Halphen" acids. This test is based on the development of a red color when malvalic or sterculic acids, or oils containing these acids are heated with a solution of sulfur in carbon disulfide and isoamyl alcohol. No such red color is formed if these acids are not present or if they have previously been hydrogenated. The Halphen test is widely used to identify cottonseed oil in mixtures with other vegetable oils, particularly to detect the adulteration of olive oil with cottonseed oil.

The greatest problems presented by the Halphen acids arise in connection with the feeding of hens with a diet containing fat and oil containing materials. The presence of the Halphen acids in oil-containing feeds adversely affects the quality of the eggs produced. While lower levels of sterculic and malvalic acids, equivalent to that contained in about 5 grams of oil per day, apparently do not adversely affect egg production levels, they may cause pink egg-white discoloration in stored eggs; and ingestion of higher levels of the acids rapidly reduces hatchability. Chicks incubated from such eggs have a high mortality rate. In addition to possible pinking of the albumin, eggs from hens which have been fed Halphen acids show elevated yolk pH, salmon-colored yolks, and iron content alterations, as well as unusually high saturated fat content of the egg lipides. All these undesirable characteristics in eggs are apparently caused by the presence of Halphen acids in the feed given the hens.

Although tests have not been conducted to determine the toxicity of Halphen acids to humans, the acids are known to disturb the potassium to sodium ratio in the blood of rats, and are apparently toxic to non-ruminants.

It is known that hydrogenation of an oil containing cyclopropenyl double bonds in the fatty acid will convert malvalic and sterculic acids to saturated derivatives. However, under normal conditions of hydrogenation in the case of cottonseed oil, there is considerable conversion of linoleic acids to oleic acid as well as trans isomer formation. Thus, if cottonseed oil is hydrogenated under conventional conditions at a temperature of 120° to 200° C. and a positive hydrogen pressure of 0 to 50 pound gauge with 0.1 to 0.2% reduced nickel catalyst until the Halphen test is negative, the oil will contain approximately 20–45% linoleic acid and 10–40% trans acid. Even under normal conditions of selective hydrogenation, 170–200° C. and 0–5 pounds gauge pressure, considerable linoleic acid (about 10%) is hydrogenated before the Halphen acids are completely inactivated.

It is therefore an object of the instant invention to provide an improved process for inactivating the Halphen acids present in fatty materials.

Another object of the instant invention is to provide an improved process for inactivating cyclopropenyl containing fatty acids from fatty oils by hydrogenating the oils without causing an appreciable increase in saturation of other unsaturated acids in the oils.

Still another object of this invention is to provide a process for hydrogenating cottonseed oils under special conditions whereby the malvalic and sterculic acids present in the oil are converted to the saturated forms without appreciable hydrogenation of the linoleic acid radicals of the triglyceride.

Other objects and advantages of this invention will become readily apparent to those skilled in the art from the following detailed description.

Generally, the instant invention comprises hydrogenating fatty oils which contain malvalic and sterculic acids, such as cottonseed oil, selectively to inactivate and remove these Halphen acids without appreciable hydrogenation (and resultant increase in the saturation) of the unsaturated acids present in the oil, and without appreciable trans acid formation. This selectivity may be effected by hydrogenation at higher than normal temperatures and lower than normal pressures, in the presence of a hydrogenation catalyst. In this method the temperature and pressure must be maintained within carefully controlled ranges, discussed more fully hereinafter. This selectivity may be attained without the rigid criticality in temperature and pressure ranges by the use of a small amount of ammonia or ammonium hydroxide to regulate catalyst activity, and thereby regulate the rate of reaction in the selective hydrogenation.

Malvalic and sterculic acids are cyclopropane acids. Malvalic acid is the 17-carbon methylene-substituted acid similar to oleic acid and having the following structure:

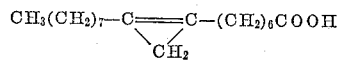

Sterculic acid has a very similar structure, having one more carbon atom, as follows:

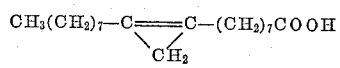

These acids give a positive reaction to the Halphen test. On hydrogenation of the acids, however, the cyclopropene rings of the acids are converted to dihydro and/or tetrahydro products which react negatively to the Halphen test. The ratio of malvalic to sterculic acid is on the order of about 10 to 1 in cottonseed oil. The acids are not present in the oils as free acids, but in the form of triglycerides.

Since it is desirable to maintain the maximum possible unsaturation in cottonseed oils and also to avoid trans acid formation, standard hydrogenation processes are unsuitable for the inactivation of the malvalic and sterculic acids from the oils by converting these acids to the dihydro derivatives. However by selectively hydrogenating under carefully controlled reaction conditions the desired result can be achieved.

In one embodiment of the invention, the hydrogenation is carried out at a higher than normal temperature used in combination with a lower than normal pressure. The reaction is conducted with agitation, for a very short period of time, and in the presence of a hydrogenation catalyst. The operating temperature range, using this method, is 200 to 300° C. and preferably about 220–230° C. Apparently this abnormally high temperature activates the Halphen acids for selective hydrogenation to the dihydro and tetrahydro branched-chain derivatives. The selectivity necessary for this reaction can be achieved with an active nickel catalyst and a limited amount of hydrogen.

The amount of catalyst used may vary between about 0.01 and 1.0% based on the oil being hydrogenated, however, about 0.1–0.2% is preferred when a nickel catalyst is used. Although nickel is the preferred catalyst, platinum or palladium may also be used.

The limited amount of hydrogen necessary to promote the desired selectivity is supplied by carrying out the hydrogenation at subatmospheric pressures. While any negative hydrogen pressure facilitates successful selective hydrogenation, pressures below about 10 pounds per square inch absolute (5 pounds gauge below atmospheric) are preferred. The only lower limit on the reduced pressures which can be used is that dictated by equipment limitations.

Hydrogenation reactions under the above conditions may generally be carried out by passing hydrogen into the oil and agitating and heating the oil for a period of about 0.1 to 10 minutes, a period of about 30 seconds to one minute being preferred. This reaction time produces an oil which does not react to the Halphen test, and yet does not have appreciable amounts of its unsaturated linoleic acids hydrogenated to more saturated acids.

The following specific examples are designed to illustrate the above described process, and should be considered illustrative only and not limiting of the instant invention.

*Example I*

A sample of refined bleached cottonseed oil containing 53% linoleic acid and 3.3% trans acid was hydrogenated at 235° C. and to 20 inches gauge pressure (subatmospheric) for 30 seconds in the presence of 0.15% nickel catalyst. The hydrogenated oil gave a negative Halphen test, and contained 53% linoleic acid and 4.4% trans acid.

*Example II*

A sample of refined bleached cottonseed oil containing 50% linoleic acid and 3½ trans acid was hydrogenated at 200° C. and 0 to 5 pounds gauge pressure for 1 minute using 0.15% nickel catalyst. The hydrogenated oil which gave a positive Halphen test contained 46% linoleic acid and 5½% trans acid. After hydrogenating for an additional minute, the oil contained 43% linoleic acid and 8.2% trans acid and gave a negative Halphen test. This example illustrates the importance of reduced pressure.

*Example III*

A sample of refined bleached cottonseed oil containing 53% linoleic acid and 3.3% trans acid was hydrogenated at 300° C. and 10 to 30 inches gauge pressure (subatmospheric) for 30 seconds using 0.5% nickel catalyst. The hydrogenated oil, which gave a negative Halphen test, contained 52% linoleic acid and 5% trans acid.

Rather than using an active nickel catalyst and a limited amount of hydrogen to achieve the selectivity necessary to the success of the instant invention, this selectivity may be achieved by using a deactivated catalyst and a surplus amount of hydrogen. Of course, the Halphen acids must still be completely activated for this selective hydrogenation by the use of abnormally high temperatures. Thus temperatures ranging from about 200 to 300° C. are used. In this method the reaction variables are less critical and the addition of ammonia or ammonium hydroxide is used to regulate the activity of the catalyst, and thereby control the rate of the selective hydrogenation reaction. The optimum amount of catalyst is from about 0.1 to 1.0%, and this can be supplemented by the use of about 0.1 to 1.0% ammonia or ammonium hydroxide.

The pressure and time of hydrogenation are a function of catalyst activity in this procedure. Positive pressures of up to 100 pounds gauge may be used with the preferred range being 0 to 50 pounds. Reaction times of 5 to 180 minutes are generally sufficient to produce the desired Halphen acid-free product without causing appreciable saturation in the oil. This embodiment of the instant invention is illustrated by the following specific examples.

*Example IV*

A sample of refined bleached cottonseed oil containing 52% linoleic acid and 3% trans acid was hydrogenated at 235° C. and 30 pounds gauge pressure for 30 minutes in the presence of 0.15% nickel catalyst and 0.5% ammonium hydroxide. The hydrogenated oil contained 50.8% linoleic acid and 5.2% trans acid, and gave a negative Halphen test.

*Example V*

A sample of refined bleached cottonseed oil containing 53% linoleic acid and 3.3% trans acid was hydrogenated at 200° C. and 100 pounds gauge pressure for 45 minutes in the presence of 0.3% nickel catalyst and 0.3% ammonium hydroxide. The hydrogenated oil, which contained 52% linoleic acid and 5% trans acid gave a negative Halphen test.

*Example VI*

A sample of refined bleached cottonseed oil containing 53% linoleic acid and 3.3% trans acid was hydrogenated at 300° C. and 10 pounds gauge pressure for 30 minutes in the presence of 0.1% nickel catalyst and 0.5% ammonium hydroxide. The resulting oil contained 51% linoleic acid and 6% trans acid, and gave a negative Halphen test.

Obviously, many modifications and variations of this invention can be made without departing from the spirit and scope thereof and therefore only such limitations should be imposed as are indicated by the appended claims.

We claim:

1. A process of selectively hydrogenating the cyclopropenyl double bonds of malvalic and sterculic acids present in cottonseed oil, which comprises: hydrogenating said oil between about 200–300° C. in the presence of a minor amount of a hydrogenating catalyst and agitating said oil in a hydrogen atmosphere at subatmospheric pressures and stopping said hydrogenation when said oil does not react to the Halphen test and before there is any appreciable saturation of the linoleic acid radicals in said oil.

2. The process of claim 1 wherein the catalyst is selected from the group consisting of nickel, platinum, and palladium.

3. The process of claim 2 wherein the catalyst is from about 0.1 to about 0.2% nickel.

4. The process of claim 1 wherein the time of hydrogenation extends from about 0.1 to about 10 minutes.

5. The process of claim 1 wherein the pressure is below about 10 pounds absolute.

6. The process of claim 1 wherein the pressure is below 10 pounds p.s.i.; and the catalyst is nickel, and the time for hydrogenating the oil is about 30 seconds.

7. A process of selectively hydrogenating the cyclopropenyl double bonds of malvalic and sterculic acids present in cottonseed oil, which comprises: hydrogenating said oil between about 200–300° C. at a positive hydrogen pressure up to about 100 pounds gauge in the presence of a minor amount of a hydrogenating catalyst and a minor amount of a catalyst regulator selected from the group consisting of ammonia and ammonium hydroxide for a time sufficient to produce a negative Halphen test but insufficient to produce any appreciable increase in the saturation of the linoleic acid radicals of said oil.

8. The process of claim 7 wherein the catalyst is nickel and is present in an amount from about 0.1% to about 1.0% and the catalyst regulator is present in an amount from about 0.1% to about 1.0%.

9. The process of claim 7 wherein the hydrogenation is carried out up to 30 pounds gauge pressure in the presence of up to 0.3% nickel catalyst and up to 0.5% ammonium hydroxide.

10. The process of claim 8 wherein the hydrogenation is carried out at a pressure between about 0 and 50 pounds gauge for a period of time from about 5 to about 180 minutes.

References Cited in the file of this patent

UNITED STATES PATENTS

| | | |
|---|---|---|
| 1,187,999 | Lowenstein | June 20, 1916 |
| 2,353,229 | Durkee | July 11, 1944 |

OTHER REFERENCES

Moore et al.: Jour. of Ind. and Engineering Chemistry, vol. 9, No. 5 (1917), page 451.

CHARLES B. PARKER, *Primary Examiner.*